United States Patent [19]
Wyatt

[11] 3,770,351
[45] *Nov. 6, 1973

[54] OPTICAL ANALYZER FOR MICROPARTICLES

[75] Inventor: Philip J. Wyatt, Santa Barbara, Calif.

[73] Assignee: Science Spectrum, Inc., Santa Barbara, Calif.

[ * ] Notice: The portion of the term of this patent subsequent to Nov. 30, 1988, has been disclaimed.

[22] Filed: Nov. 23, 1971

[21] Appl. No.: 201,469

Related U.S. Application Data

[63] Continuation of Ser. No. 777,837, Nov. 21, 1968.

[52] U.S. Cl. ............................... 356/102, 356/104
[51] Int. Cl. ..................... G01n 15/02, G01n 21/00
[58] Field of Search.................... 356/102, 103, 104, 356/75; 250/51.5, 43.5 ED; 350/162

[56] References Cited
UNITED STATES PATENTS

| | | | |
|---|---|---|---|
| 2,816,479 | 12/1957 | Sloan | 356/102 |
| 3,499,159 | 3/1970 | Carrier et al. | 356/103 |
| 3,427,451 | 2/1969 | Spielberg | 250/51.5 |

Primary Examiner—Ronald L. Wibert
Assistant Examiner—Conrad Clark
Attorney—James E. Hawes et al.

[57] ABSTRACT

There is described a method and apparatus for identifying submicroscopic particles by directing the particles through a highly collimated beam of light and simultaneously measuring the light intensity at a plurality of different angles relative to the point where the particles move through the beam.

45 Claims, 2 Drawing Figures

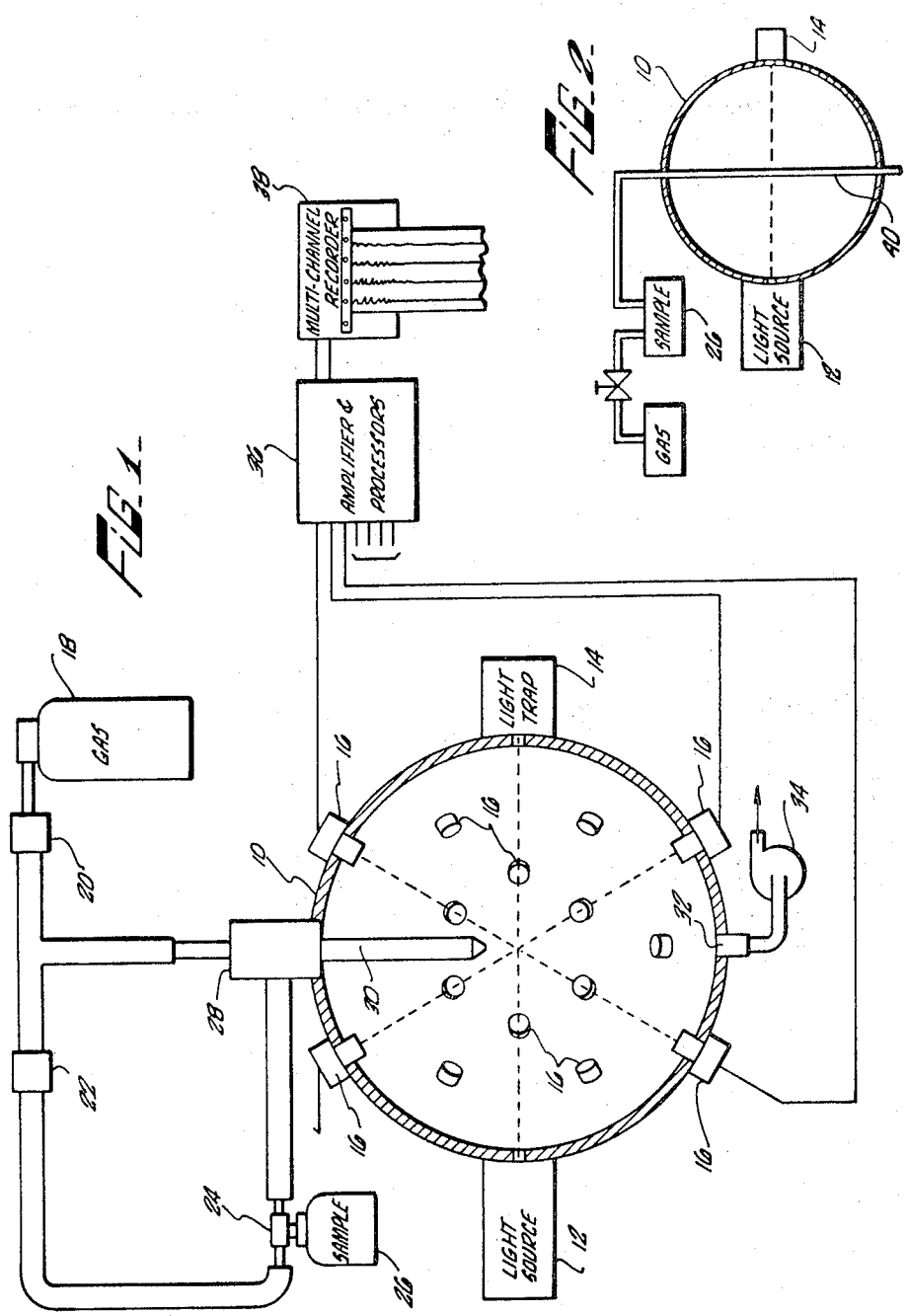

OPTICAL ANALYZER FOR MICROPARTICLES

This is a continuation of application Ser. No. 777,837, filed Nov. 21, 1968.

BACKGROUND OF THE INVENTION

This invention relates to the method and apparatus for identifying microparticles, and more particularly, to the identification of microparticles by measurement of the intensity pattern of scattered light.

There has long been a need for analysis and identification of particulate matter such as dust particles, particulate pollutants, spores, microorganisms, blood cells and other organic cells. Such microparticles typically are of sizes ranging from 0.01 micron up to 100 microns in size. Because of their small size, rapid detection and identification of microparticles represent a difficult problem. Such particles are normally too small to be effectively analyzed by an optical microscope. The electron microscope requires special preparation of the sample and imposes severe environmental limitations which are not suitable for analyzing many types of organic particles, for example. While various optical devices have been developed for utilizing light scattered from the particles to detect the presence of the particle, such known devices are useful only in determining particle densities and yield practically no information as to the qualitative composition of the individual particles being analyzed.

The present invention is directed to a method and apparatus for rapid, quantitative analysis of physical properties of microscopic particulate matter based on the light scattering properties of the particles being analyzed.

The present invention operates on the principle that the light scattering properties of a particle are uniquely determined for different types of particles by its physical properties such as its electromagnetic characteristics, shape, and size. In theory, the physical characteristics of a particle should be determinable from information on the light scattering characteristics of the particle. Thus, by analyzing the radiation scattered from a particle, it is possible to develop much information about the physical characteristics of the particle. However, because of the small size of the particles, it is extremely difficult to isolate and hold a single particle in a manner which permits measurement of the intensities of radiation in sufficient number of different directions to develop an accurate analysis of the particle under study. Moreover, many particles, such as organic microorganisms, are very sensitive to environmental conditions and may change or deteriorate before an effective analysis can be made.

SUMMARY OF THE INVENTION

The present invention provides a method and apparatus for rapidly analyzing microparticles by measurement of the light scattering properties of the particles. This is accomplished, in brief, by providing a highly collimated beam of electromagnetic radiation, such as from a laser, directing the microparticles in a stream which intersects the light beam, and detecting the intensity of light scattered by a particle in passing through the light beam by a plurality of detectors positioned at a number of different angles in relation to the point of intersection between the light and the particle stream. The resulting "pattern" of the outputs of the detectors is uniquely related to the scatterer and yields information by which its characteristics may be determined.

BRIEF DESCRIPTION OF THE DRAWING

For a more complete understanding of the invention, reference should be made to the accompanying drawing, wherein:

FIG. 1 is a partially schematic representation of a preferred embodiment of the invention; and FIG. 2 is a cross-sectional view showing an alternative embodiment of the invention.

DESCRIPTION OF A SPECIFIC EMBODIMENT

Referring to FIG. 1 in detail, the numeral 10 indicates a spherical chamber. The chamber provides a completely enclosed space, permitting a controlled environment from which all external light is excluded and in which the atmosphere can be suitably controlled. A light source 12 is mounted on the outside of the chamber 10 and is arranged to direct a beam of light along one diameter of the interior of the spherical chamber. Light source 12 may be any suitable means for providing a highly collimated beam of electromagnetic radiation. The light source 12 may, for example, be a laser, or might be an arc lamp or incandescent lamp together with narrow band filters and suitable collimating condensers for providing the narrow light beam. A laser may be preferred because it has a high degree of monochromaticity, it generates a highly collimated light beam, and it provides extremely high light intensity. Typically, the beam has a cross-sectional diameter of a millimeter or less. A suitable light trap 14 is positioned diametrically opposite the light for absorbing the energy of the beam and preventing any reflection or scattering of the beam back into the interior space of the chamber.

Mounted in the wall of the chamber 10 are a plurality of light detectors 16. The detectors are directed toward the center of the spherical chamber and are mounted at equal radial distances from that point. The detectors preferably are collimated photomultipliers which have very high sensitivity and a braod dynamic operating range. However, other types of radiation detectors, such as photodiodes, phototransistors, bolometers and the like, and modifications of such devices could be used. Detectors should each subtend a small solid angle and are spaced about the circumference of the chamber.

The sample particles being analyzed are introduced into the chamber so as to be directed along a diameter of the spherical chamber 10. Thus, the particles pass through the light beam. The particles are preferably injected in a gas stream and are dispersed and spread out sufficiently in the stream so that normally only a single particle is in the beam at a time. One arrangement for injecting the particles, as shown in FIG. 1, includes a source 18 of an inert gas such as nitrogen under pressure. The gas is filtered by a suitable filter 20 and a portion of the gas is directed through a pressure reducer 22 to an atomizer 24. The particulate matter under investigation is preferably dispersed in a highly volatile fluid in a sample container 26 connected to the atomizer 24. As the atomizer sprays the liquid containing the particles out of the atomizer, the liquid evaporates leaving the particles in a highly dispersed state.

From the atomizer, these particles are drawn into an injection chamber 28 to which also is connected the high-pressure gas source 18. The particles are picked up in the injection chamber by the stream of high-pressure gas which flows out of the chamber through a nozzle 30 into the interior of the chamber 10. The nozzle 30 directs the high-velocity stream of gas containing the dispensed particles in a fine stream passing through the beam of light at the center of the -spherical chamber. The stream is directed toward an exhaust opening 32, which is connected to an exhaust pump 34, by means of which the sample particles are continuously withdrawn from the chamber.

As each particle passes through the light beam, it scatters the light both by reflection and refraction, as well as diffraction. Scattered radiation is sensed by the light detectors 16, each detector sensing the scattering event from a different fixed observation angle. Each of the detectors 16 is connected to amplifiers, which may include processing circuitry such as time discriminators and ratiometers, indicated generally at 36, the output of the amplifiers driving a recording device such as a multichannel strip recorder 38. Thus, the output of each detector may be recorded as a separate trace on a multichannel recorder. When taken together, the separate traces at any selected point along the length of the chart indicate the relative intensities of light falling on all of the detectors at some instant of time. From this data, it will be apparent that a plot can be made of the intensity of the scattered radiation as a function of angle at the instant a particular particle is in the light beam.

It will be appreciated that other data analysis techniques may be applied, such as digitizing the analog information derived from the detectors and supplying the digitized data to a computer where it can be compared with data of a number of known samples.

It is desirable for satisfactory operation, that the orientation of the particle not change while it is passing through the light beam. For this reason, fairly high flow rates of the order of one meter per second are desirable. While the total time the particles are exposed to dehydration effects of the gas during the measurement may be quite small, on certain types of particles it may be desirable to maintain them in a liquid medium during the measurement. Such an arrangement is shown in FIG. 2, in which the particles are suspended in a liquid sample and directed through a capillary tube 40 which extends along the diameter of the spherical chamber 10 and intersects the beam from the light source 12. The liquid medium, being more viscous than the gas used in the embodiment of FIG. 1, tends to maintain the particles in alignment even though they pass through the light beam at much slower flow rates.

From the above description, it will be recognized that the present invention provides a method and apparatus for analyzing microparticles based on the intensity distribution of scattered light measured simultaneously at a number of different angles. A large number of readings can be taken in a relatively short time. Sampling rates of the order of a thousand particles a second is possible. It will be recognized that while the above description is directed to a preferred embodiment of the invention, many modifications are possible within the scope of the invention as defined by the claims. For example, light sources of different frequencies may be employed, depending upon the size of the particles being analyzed. It has been found that preferably the ratio of the circumference of the particle to the wave length of the light should lie in the range between one and 10. If the ratio is much less than one, there is considerable loss in detail in the scattering pattern. On the other hand, if the ratio is much greater than ten, the differential scattered intensity pattern becomes extremely complex, greatly complicating the identity analysis. An additional analysis tool is provided by polarizing the light source and/or the detectors since the scattering properties of some particles are affected by a polarization of the light. Also it will be appreciated that the light source can be pulsed to reduce the average power and provide pulsed outputs from the detectors, permitting a-c amplification. While normally it is preferable that a single particle pass through the light beam at a time, where the particles are symmetrical in shape, they may be examined in groups and still provide a characteristic scattering pattern.

What is claimed is:

1. A microparticle analyzer, comprising:
   means for providing a narrow, collimated incident beam of radiant energy;
   means for introducing a microparticle into said beam;
   means for simultaneously detecting the intensity of radiant energy scattered by said microparticle at more than two offset angular locations about said particle, relative to the direction of said incident beam, sufficient to derive a differential scattering pattern characteristic of the electromagnetic, shape and size properties of said microparticle; and
   means for registering the values of said intensity of said energy detected at each of said locations to derive said pattern from said registered values of said scattered radiation as a function of angle with respect to said incident beam.

2. The analyzer of claim 1, wherein:
   said beam-providing means is constructed and arranged to generate said beam as a substantially coherent and monochromatic beam of light.

3. The anlayzer of claim 1, wherein:
   said introducing means is constructed and arranged for introducing a plurality of microparticles into said beam at a predetermined location and said radiation is scattered from said plurality of microparticles.

4. The analyzer of claim 1, wherein:
   said radiant energy is light.

5. The analyzer of claim 4, wherein:
   said registering means is constructed and arranged to graphically record a series of traces in coordinate reference systems each having one coordinate representing time, and a second coordinate representing the values of the intensity of the radiant energy detected at a corresponding one of said locations, the first coordinates of said reference systems being time-correlated.

6. The analyzer of claim 4, wherein:
   said introducing means is constructed and arranged for introducing a plurality of microparticles into said beam at a predetermined location and said radiation is scattered from said plurality of microparticles.

7. The analyzer of claim 4, wherein:
   said particle location is predetermined and said detection locations are angularly spaced about a circular locus centered on said predetermined location.

8. The analyzer of claim 4, wherein:
said particle location is predetermined and said detection locations are angularly spaced on a circular locus centered on said predetermined location.

9. The analyzer of claim 4, wherein:
said light is polarized.

10. The analyzer of claim 4, further comprising:
means for digitizing said differential scattering pattern;
means for storing said digitized pattern;
means for storing a digitized reference pattern; and
computer means coupled to said digitizing and storing means for comparing said patterns.

11. The analyzer of claim 4, wherein:
said detecting means includes means for detecting said light at a selected frequency.

12. The analyzer of claim 4, wherein:
said particle location is predetermined and said detection locations are angularly spaced on a circular locus centered on said predetermined location.

13. The analyzer of claim 4, wherein: said detection means includes means to polarize said scattered light.

14. The analyzer of claim 1, wherein:
said beam-providing means includes a laser.

15. The analyzer of claim 14, wherein:
said particle location is predetermined and said detection locations are angularly spaced on a circular locus centered on said predetermined location.

16. The method of analyzing microparticles, which comprises the steps of:
detecting the intensity of radiant energy scattered by a microparticle, located in an incident beam of radiant energy, at more than two offset angular locations about said microparticle, relative to the direction of said incident beam, sufficient to derive a differential scattering pattern characteristic of the electromagnetic, shape and size properties of said microparticle;
registering the value of said intensity of the radiant energy received at each of said locations;
deriving said pattern from said registered values of the scattered radiation as a function of angle with respect to said incident beam;
producing an independently derived reference pattern of scattered radiation as a function of angle with respect to an incident beam; and
comparing selected characteristics of said registered values pattern and said reference pattern to analyze said microparticles.

17. The method of claim 16, wherein:
said radiant energy is light.

18. The method of claim 17, wherein:
said pattern is derived from simultaneously registered values.

19. The method of claim 17, wherein:
said detecting at said locations is simultaneous.

20. The method of claim 17, wherein:
said beam is narrow, collimated, coherent and monochromatic.

21. The method of claim 17, wherein:
said incident light is polarized.

22. The method of claim 21, wherein:
the first said pattern is derived from simultaneously derived values; and
said detecting at said locations is simultaneous.

23. The method of claim 22, wherein:
said independently derived reference pattern is obtained by
detecting the intensity of radiant energy scattered by a second microparticle, located in an incident beam of radiant energy, at more than two offset angular locations about said second microparticle, relative to the direction of said incident beam, sufficient to derive a differential scattering pattern characteristic of the electromagnetic, shape and size properties of said second microparticle;
registering the value of said intensity of the radiant energy received from said second microparticle at each of said locations; and
deriving said reference pattern from said registered values of the scattered radiation as a function of angle with respect to said incident beam.

24. The method of claim 23, wherein:
a plurality of microparticles is introduced into the beam at a predetermined location and said radiaton is scattered from said plurality of microparticles.

25. The method of claim 22, wherein:
said differential scattering pattern is digitized and stored in a computer;
said reference pattern is digitized and stored in said computer; and
said comparison step is performed in said computer.

26. The method of claim 25, wherein: said scattered light is polarized.

27. The method of claim 25, wherein:
a plurality of microparticles is introudced into the beam at a predetermined location and said radiation is scattered from said plurality of microparticles.

28. The method of claim 25, wherein:
said incident light is polarized.

29. The method of claim 28, wherein:
a plurality of microparticles is introduced into the beam at a predetermined location and said radiation is scattered from said plurality of microparticles.

30. The method of claim 22, wherein:
a plurality of microparticles is introduced into the beam at a predetermined location and said radiation is scattered from said plurality of microparticles.

31. The method of claim 17, wherein:
said independently derived reference pattern is obtained by
detecting the intensity of radiant energy scattered by a second microparticle, located in an incident beam of radiant energy, at more than two offset angular locations about said second microparticle, relative to the direction of said incident beam, sufficient to derive a differential scattering pattern characteristic of the electromagnetic, shape and size properties of said second microparticle;
registering the value of said intensity of the radiant energy received from said second microparticle at each of said locations; and
deriving said reference pattern from said registered values of the scattered radiation as a function of angle with respect to said incident beam.

32. The method of claim 31, wherein:
a plurality of microparticles is introduced into the beam at a predetermined location and said radiation is scattered from said plurality of microparticles.

33. The method of claim 17, wherein:
said differential scattering pattern is digitized and stored in a computer;
said reference pattern is digitized and stored in said computer; and
said comparison step is performed in said computer.

34. The method of claim 33, wherein:
a plurality of microparticles is introduced into the beam at a predetermined location and said radiation is scattered from said plurality of microparticles.

35. The method of claim 17, wherein:
the first said pattern is derived from simultaneously registered values;
said detecting at said locations is simultaneous;
said differential scattering pattern is digitized and stored in a computer;
said comparison step is performed in said computer.

36. The method of claim 35, wherein:
a plurality of microparticles is introduced into the beam at a predetermined location and said radiation is scattered from said plurality of microparticles.

37. The method of claim 17, wherein:
the first said pattern is derived from simultaneously registered values;
said detecting at said locations is simultaneous;
said independently derived reference pattern is obtained by
detecting the intensity of radiant energy scattered by a second microparticle, located in an incident beam of radiant energy, at more than two offset angular locations about said second microparticle, relative to the direction of said incident beam, sufficient to derive a differential scattering pattern characteristic of the electromagnetic, shape and size properties of said second microparticle;
registering the value of said intensity of the radiant energy received from said second microparticle at each of said locations; and
deriving said reference pattern from said registered values of the scattered radiation as a function of angle with respect to said incident beam.

38. The method of claim 37, wherein:
said differential scattering pattern is digitized and stored in a computer;
said reference pattern is digitized and stored in said computer; and
said comparison step is performed in said computer.

39. The method of claim 38, wherein:
a plurality of microparticles is introduced into the beam at a predetermined location and said radiation is scattered from said plurality of microparticles.

40. The method of claim 37, wherein:
a plurality of microparticles is introduced into the beam at a predetermined location and said radiation is scattered from said plurality of microparticles.

41. The method of claim 17, wherein:
a plurality of microparticles is introudced into the beam at a predetermined location and said radiation is scattered from said plurality of microparticles.

42. The method of claim 17, wherein:
said particle is predetermined and said detection locations are angularly spaced on a circular locus centered on said predetermined location.

43. The method of claim 17, wherein:
said particle location is predetermined and said locations are angularly spaced on a spherical locus centered on said predetermined location.

44. The method of claim 17, wherein:
said light is detected at a selected frequency.

45. The method of claim 17, wherein: said scattered light is polarized.

* * * * *